Jan. 5, 1954  M. R. MULFORD  2,664,670
PLANT PACKAGE
Filed Aug. 12, 1948
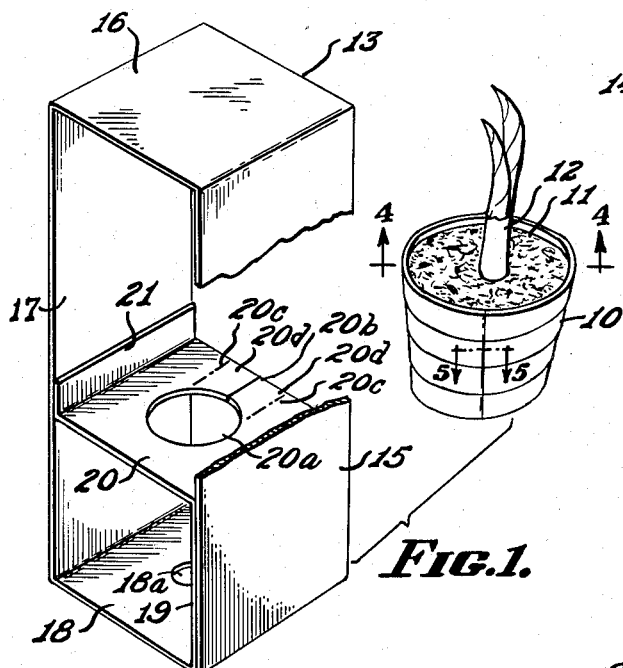
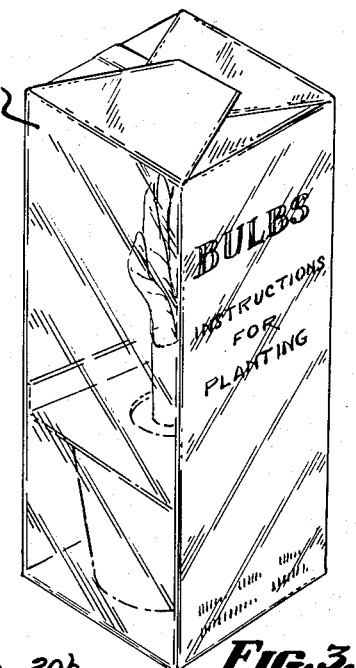
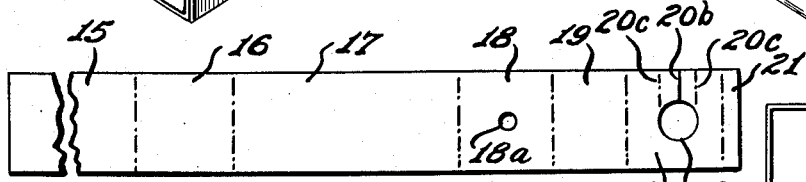
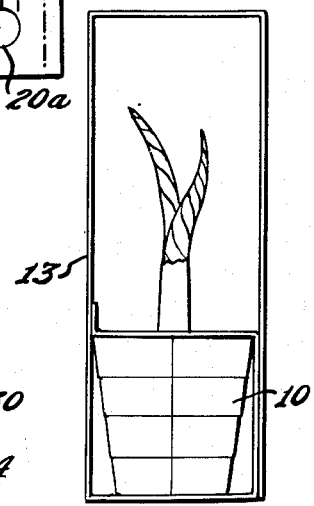
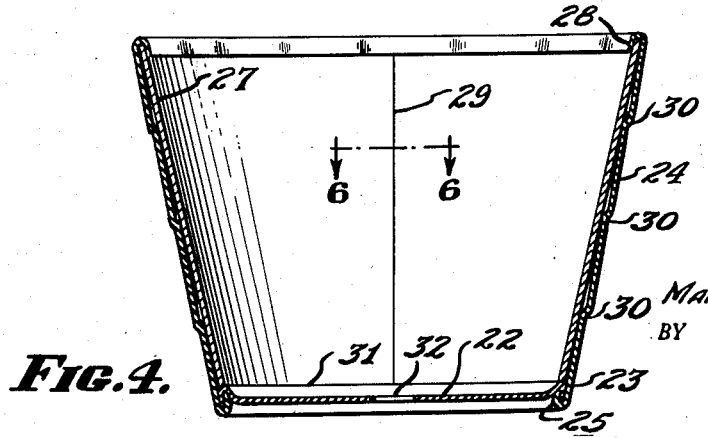
INVENTOR.
MARION R. MULFORD
BY
Allen & Allen
ATTORNEYS.

Patented Jan. 5, 1954

2,664,670

UNITED STATES PATENT OFFICE 2,664,670

PLANT PACKAGE

Marion R. Mulford, Lebanon, Ohio, assignor to Hewett P. Mulford & Company, Lebanon, Ohio, a partnership Application August 12, 1948, Serial No. 43,889

2 Claims. (Cl. 47—37)

This invention relates to a plant package and more specifically to a package designed to hold a potted plant for shipment, storage, and display, as well as for growing.

In a plant package it is desirable that the plant be readily visible so that the prospective purchaser may examine it and be sure that he is getting a healthy plant of the particular specie he desires. It is also desirable that light may have access to the plant, while it is in the package in order to promote its healthy growth. In view of the fact that the plant when sold in packages of the class under discussion are purchased by the consumer, the plants are usually transplanted and the package is thrown away. It is, therefore, of great importance that the package be very inexpensive.

With the foreging considerations in mind, it is an object of my invention to provide a plant package which is attractive in appearance and inexpensive in manufacture which will permit ready visual inspection of the contents as well as permitting access of light to the plant in the package.

More specifically, it is a further object of my invention to provide a package consisting of three elements, a pot, a pot holding member, and a wrapper.

It is an object of my invention ot provide the component parts as outlined so that the pot serves to hold the pot holding member in erected condition and the wrapper serves to hold the entire assembly together. It is yet another object of my invention to provide a package which permits irrigation of the plant so that it will not dehydrate or die, if it is not immediately sold. Still another object of my invention lies in the provision of a package which is simple to assemble whereby the overall cost of packaging is reduced.

These and other objects of my invention which I shall point out in more detail hereinafter or which will be apparent to one skilled in the art after a study of these specifications, I accomplish by that certain construction and arrangement of parts of which I shall now describe an exemplary embodiment. Reference is made to the drawing forming a part hereof and in which:

Figure 1 is an exploded view of a pot containing a plant and a pot holding member, portions of the latter being cut away to show the construction.

Figure 2 is a side elevational view of the pot and pot holding member in assembly.

Figure 3 is a perspective view of the completed package.

Figure 4 is a cross sectional view taken on the line 4—4 of Figure 1 showing details in the construction of the pot.

Figure 5 is a fragmentary cross sectional view on a large scale taken on the line 5—5 of Figure 1.

Figure 6 is a fragmentary cross sectional view taken on the line 6—6 of Figure 4.

Figure 7 is a plan view on a reduced scale of the blank from which the pot holding member is formed.

Briefly, in the practice of my invention, I provide a pot indicated generally at 10, which may be filled with a suitable growing medium at 11 and containing a plant 12. A pot holding member indicated generally at 13 carries the pot as seen best in Figures 2 and 3, and the entire package is finally wrapped in a transparent wrapper indicated generally at 14 to make the complete package seen in Figure 3.

Coming now to a more detailed description of the various elements of the package, the pot holding member is a cut and scored blank shown in Figure 7. This blank comprises in articulation and in the order named a side wall 15, a top 16, a side wall 17, a bottom 18, a partition supporting element 19, a partition element 20, and a glue flap 21. The blank is folded on the lines of articulation between the members 15 to 21, inclusive, to form a generally rectangular band with a partition 20 thereacross. The partition supporting member 19 is adhesively secured to the wall member 15 and the glue flap 21 is adhesively secured to the wall 17. The bottom member 18 is provided with the hole 18a for a purpose to be described hereinafter and the partition member 20 is provided with the hole 20a, the cut 20b extending between the hole 20a and the edge of the blank and the two score lines 20c parallel to the cut 20b and on each side thereof.

The asembled blank in the form seen in Figure 1 can be collapsed and, if desired, shipped flat. When erected to the form of Figure 1, it is non-self-sustaining and in order to maintain the member 13 in its erected condition, I provide the pot member 10 which is of a height substantially equal to the height of the partition supporting member 19 and of a diameter which is substantially equal to the length of the partition 20 so that the pot member 10 fits tightly within the pot holding member 13 as best seen in Figure 2. With the bottom of the pot resting on the bottom of the pot holding member and with the partition member 20 bearing relatively tightly against the top of the pot, the pot serves to hold the carton in its erected condition. The significance of the members 20a, 20b, and 20c will now be apparent. When it is desired to insert a pot into the pot holding member, if the pot contains a growing plant, the flaps 20d demarked by the score lines 20c and a cut 20b may be folded up to permit the stem of the plant to enter the aperture 20a whereupon the flaps 20d may again be folded down to their original position.

The pot itself is best seen in Figures 4, 5, and 6 and it comprises a bottom member 22 substantially of circular form having the bead 23 annularly formed thereon. The wall portion of the pot is constituted of a piece of metal foil 24 having the upturned bottom edge 25 which is crimped into engagement with the bead 23 and having a substantially vertical crimped seam as indicated at 26 in Figure 5.

The foil from which the wall 24 is formed is relatively thin and would not of itself be strong enough to form a rigid pot. For stiffening purposes, I insert a cardboard liner 27, the bottom edge of which rests upon the bead 23 and I crimp the upper edge of the wall member 24 over the upper edge of the stiffener member 27 as at 28. The stiffener member 27 has the simple butt joint 29. The member 24 may be provided with the annular stepped ridges 30 for further stiffening, if desired. The material 27 is preferably proofboard and it is preferably proofed after assembly to the pot so that the butt joint at 29 is rendered waterproof and so that the butt joint between the bottom of the member 27 and the bead 23 and indicated in Figure 4 at 31 is also rendered waterproof. A pot according to this construction is of extremely light weight and yet by virtue of its construction it is rigid enough to withstand the rigors of ordinary shipment successfully. The foil gives the pot a decorative appearance and gives it an appearance of quality which could not be otherwise achieved except at a greatly increased cost.

The bottom member 22 of the pot is perforated as at 32 so that when the pot is assembled in the pot holding member, the apertures 32 and 18a are substantially aligned.

The package is completed by being wrapped in a transparent material, such as "Cellophane," as indicated at 14 in Figure 3. This wrapping may be done by conventional methods or conventional machines, but I prefer that the adhesive be waterproof or that the seams be produced by the operation known as welding, where a solvent for the material is used to cause adhesion. The side walls of the blank 15 and 17 may be printed so that instructions and the like may be legible through the transparent wrapping material. If desired, the wrapping material may be opaque printed in the regions which overlie the side walls, top, and bottom walls, and instructions may be printed directly on the wrapping material.

If it becomes desirable to irrigate the plant while it is still in its package, the wrapping material may simply be punctured at the bottom and the package may then be stood up in a pan of water, so that the water will seep in through the apertures 18a and 32.

If the plant is not immediately sold and grows rapidly while on display, the wrapping material 14 at the top of the package may be cut away and the top wall 16 of the holding member may be severed from either the side wall 15 or 17 along the respective fold line whereby the top of the package may be opened and the plant may grow up through the top.

The particular pot according to my invention is decorative enough so that the customer may simply remove the wrapper and the pot holding member and let the plant continue to grow in the pot 10. If it is desired to transplant the plant, the pot may simply be discarded because it is extremely inexpensive.

Having now fully described my invention, it will be apparent that numerous modifications may be made therein without departing from the spirit thereof, and I, therefore, do not intend to limit myself except as set forth in the claims which follow.

Having thus described my invention, what I claim as new and desire to secure by Letters Patent is:

1. A plant package comprising a pot holding member, a pot and a transparent wrapper to hold the entire package in assembly, said pot holding member consisting of a cut and scored paperboard blank having in articulation in the order named, a side wall, a top wall, a side wall, a bottom wall, a partition supporting member, a partition member and a glue flap, said partition supporting member being adhesively secured to said first mentioned side wall, and said glue flap being adhesively secured to said second mentioned side wall, to form a rectangular band having a partition thereacross substantially parallel to said top and bottom walls, said partition having a substantially centrally disposed opening therein, said pot being of a height substantially equal to the height of said partition supporting member, and of a diameter substantially equal to the length of said partition member, said pot being inserted between said bottom member and said partition member and between said side walls, thereby acting to maintain said pot holding member in erected condition, said wrapper completely surrounding said assembly of pot holding member and pot and providing transparent walls on opposite sides of said package adjacent said first mentioned side walls, and acting to retain said pot against lateral displacement from said pot holding member, whereby to provide a protective package for a plant placed in said pot and yet affording a full length view of a plant placed therein.

2. A plant package according to claim 1 in which a cut extends from the opening in said partition member to the edge of said partition, said cut being substantially on the diameter of said opening and extending substantially parallel to the line of articulation between said partition and said glue flap, and in which spaced apart score lines are provided parallel to said cut on each side thereof, whereby a plant extending above the top of said pot may be placed in said pot holding member.

MARION R. MULFORD.

References Cited in the file of this patent

UNITED STATES PATENTS

| Number | Name | Date |
|---|---|---|
| 404,585 | Wright | June 4, 1889 |
| 679,171 | Jones | July 23, 1901 |
| 760,886 | Lord | May 24, 1904 |
| 880,549 | Lord | Mar. 3, 1908 |
| 1,342,069 | Schumaker | July 1, 1920 |
| 1,606,523 | Gardner | Nov. 9, 1926 |
| 1,709,860 | Lovett, Jr. | Apr. 23, 1929 |
| 1,719,681 | Wiebusch | July 2, 1929 |
| 1,899,547 | Addis et al. | Feb. 28, 1933 |
| 1,964,669 | Quillen et al. | June 26, 1934 |
| 2,017,308 | Elmer | Oct. 15, 1935 |
| 2,140,932 | Avery | Dec. 20, 1938 |
| 2,193,237 | Mueller et al. | Mar. 12, 1940 |
| 2,341,374 | Gardner | Feb. 8, 1944 |
| 2,473,582 | Goodwin | June 21, 1949 |